US012694063B2

(12) United States Patent
Wu et al.

(10) Patent No.: US 12,694,063 B2
(45) Date of Patent: Jul. 28, 2026

(54) AUTOMATIC OPERATOR FUSION METHOD FOR COMPUTATIONAL GRAPH AND RELATED PRODUCT

(71) Applicant: Shanghai Cambricon Information Technology Co., Ltd., Shanghai (CN)

(72) Inventors: Lingdong Wu, Shanghai (CN); Yunzhao Yang, Shanghai (CN); Long Deng, Shanghai (CN)

(73) Assignee: Shanghai Cambricon Information Technology Co., Ltd., Shanghai (CN)

( * ) Notice: Subject to any disclaimer, the term of this patent is extended or adjusted under 35 U.S.C. 154(b) by 0 days.

(21) Appl. No.: 19/126,571

(22) PCT Filed: Jun. 28, 2023

(86) PCT No.: PCT/CN2023/103286
§ 371 (c)(1),
(2) Date: May 1, 2025

(87) PCT Pub. No.: WO2024/093292
PCT Pub. Date: May 10, 2024

(65) Prior Publication Data
US 2026/0170057 A1     Jun. 18, 2026

(30) Foreign Application Priority Data

Nov. 2, 2022    (CN) .......................... 202211372965.4

(51) Int. Cl.
*G06F 16/901*          (2019.01)
*G06F 18/25*           (2023.01)
(52) U.S. Cl.
CPC .......... *G06F 16/9024* (2019.01); *G06F 18/25* (2023.01)

(58) Field of Classification Search
CPC ............................. G06F 16/9024; G06F 18/25
See application file for complete search history.

(56) References Cited

U.S. PATENT DOCUMENTS 9,798,527 B1    10/2017  Bendersky et al.
11,714,992 B1 *  8/2023  Heaton .................. G06N 3/084
                                                            706/15

(Continued)

FOREIGN PATENT DOCUMENTS

CN          110321999 A        10/2019
CN          112183712 A        1/2021

(Continued)

*Primary Examiner* — Etienne P Leroux
(74) *Attorney, Agent, or Firm* — Rimon PC

(57)          ABSTRACT

This disclosure discloses a method for automatic fusion of operators in a computational graph, a computing device, and related products. The computing device may be included in a combination processing device, which may also include an interface device and other processing devices. The computing device interacts with other processing devices to jointly complete computing operations specified by the user. The combined processing devices may also include a storage device, which is connected to the computing device and other processing devices respectively, for storing data of the computing device and other processing devices. The solution disclosed herein provides a solution for automatic fusion of operators in a computational graph, which may automatically search for optimized operator fusion solutions without the need for manual analysis, thereby improving the efficiency of fusion analysis.

20 Claims, 8 Drawing Sheets

(56)      References Cited

U.S. PATENT DOCUMENTS

| | | | | |
|---|---|---|---|---|
| 12,373,678 | B2* | 7/2025 | Chen | G06N 5/01 |
| 2021/0027197 | A1* | 1/2021 | Foerster | G06F 9/5066 |
| 2021/0248115 | A1* | 8/2021 | Jones | G06F 9/5066 |
| 2022/0366249 | A1* | 11/2022 | Zou | G06N 3/0495 |
| 2022/0413862 | A1* | 12/2022 | Ren | G06F 9/30145 |
| 2023/0334292 | A1* | 10/2023 | Zhang | G06N 3/0464 |
| 2024/0062116 | A1* | 2/2024 | He | G06N 20/00 |
| 2024/0412076 | A1* | 12/2024 | Gupta | G06N 3/0985 |

FOREIGN PATENT DOCUMENTS

| | | | |
|---|---|---|---|
| CN | 112965710 | A | 6/2021 |
| CN | 114358261 | A | 4/2022 |
| CN | 114692860 | A | 7/2022 |
| CN | 114841327 | A | 8/2022 |
| CN | 115756478 | A | 3/2023 |
| WO | 2022087788 | A1 | 5/2022 |

* cited by examiner

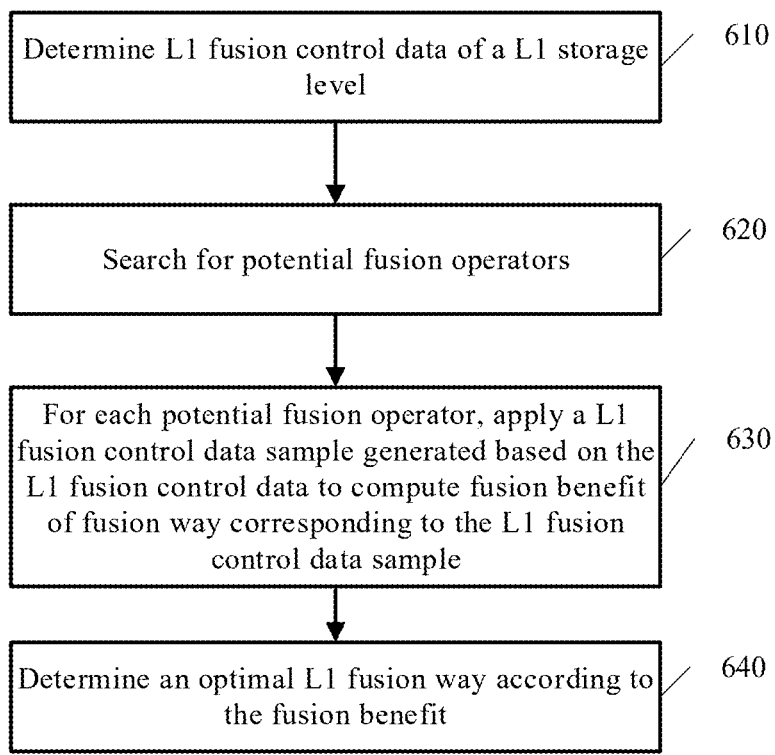

Determine L1 fusion control data of a L1 storage level — 610

Search for potential fusion operators — 620

For each potential fusion operator, apply a L1 fusion control data sample generated based on the L1 fusion control data to compute fusion benefit of fusion way corresponding to the L1 fusion control data sample — 630

Determine an optimal L1 fusion way according to the fusion benefit — 640

FIG. 6

Backtracking direction

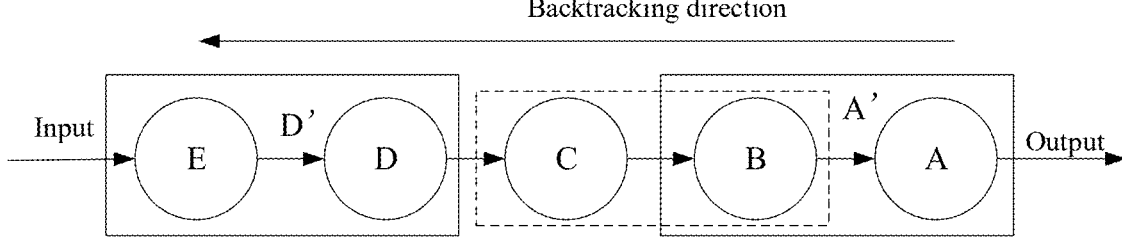

Input

E   D'   D   C   B   A'   A   Output

FIG. 7

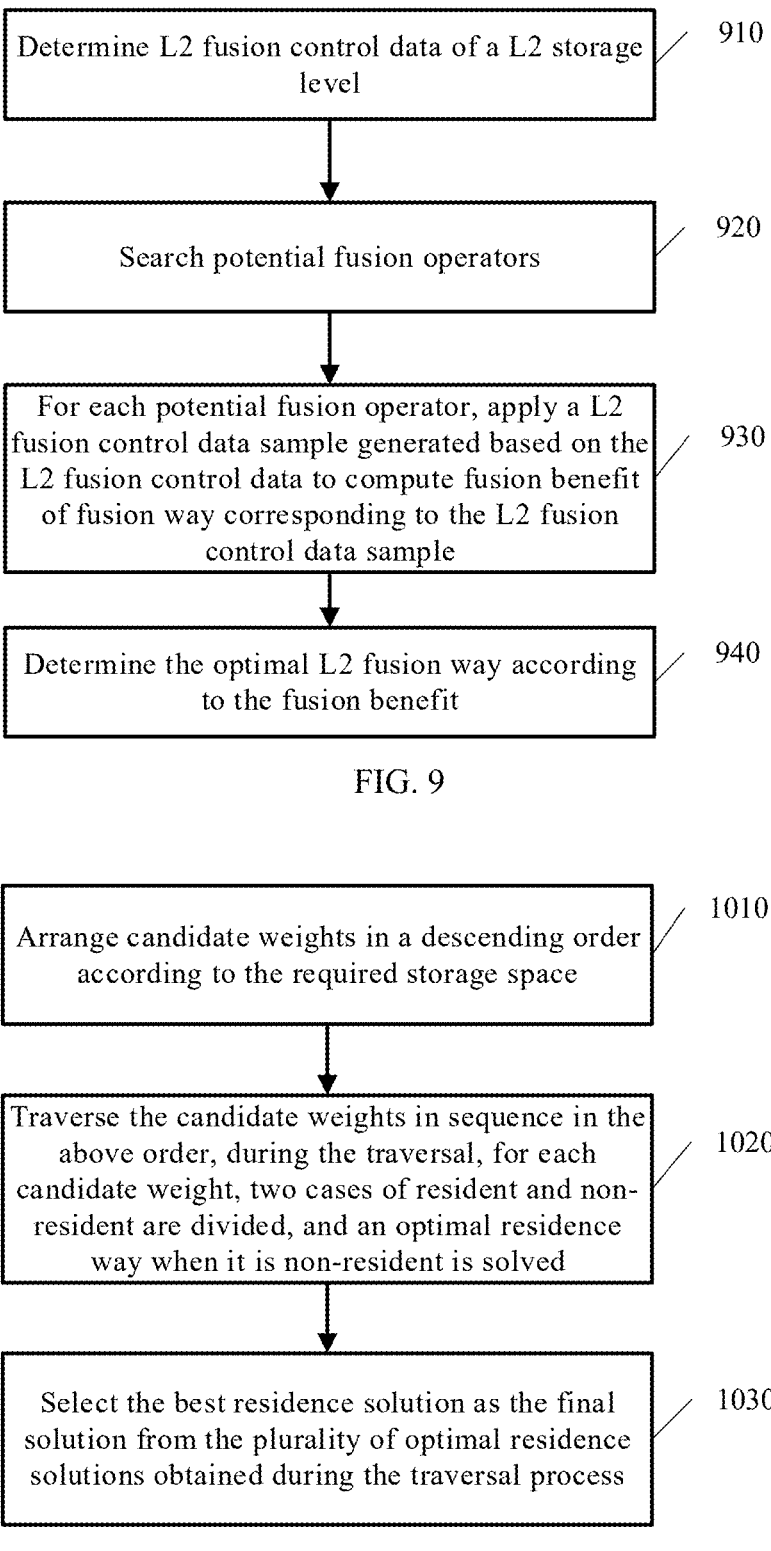

Determine L2 fusion control data of a L2 storage level                    910

Search potential fusion operators                    920

For each potential fusion operator, apply a L2 fusion control data sample generated based on the L2 fusion control data to compute fusion benefit of fusion way corresponding to the L2 fusion control data sample                    930

Determine the optimal L2 fusion way according to the fusion benefit                    940

FIG. 9

Arrange candidate weights in a descending order according to the required storage space                    1010

Traverse the candidate weights in sequence in the above order, during the traversal, for each candidate weight, two cases of resident and non-resident are divided, and an optimal residence way when it is non-resident is solved                    1020

Select the best residence solution as the final solution from the plurality of optimal residence solutions obtained during the traversal process                    1030

FIG. 10a

AUTOMATIC OPERATOR FUSION METHOD FOR COMPUTATIONAL GRAPH AND RELATED PRODUCT

CROSS REFERENCE TO RELATED APPLICATION

The present application is a national stage application of PCT/CN2023/103286 filed on Jun. 28, 2023, and titled AUTOMATIC OPERATOR FUSION METHOD FOR COMPUTATIONAL GRAPH AND RELATED PRODUCT, which claims priority to Chinese Patent Application No. 202211372965.4 with the title of "Automatic operator fusion method for computational graph and related product" filed on Nov. 2, 2022. The content of both applications is hereby incorporated by reference in their entireties.

TECHNICAL FIELD

The present disclosure relates generally to the field of intelligent computing, and particularly to the field of neural networks. More specifically, the present disclosure relates to a method for automatic fusion of operators in a computational graph, a computing device, and a computer-readable storage medium.

BACKGROUND

A neural network is a system of a plurality of neurons connected according to certain rules. It is generally composed of the following four layer structures: input layer, convolution layer, pooling layer, and fully connected layer. With the development of technology, the number of layers of neural networks is increasing. Taking the classic VGG architecture as an example, VGG-A has 11 weight layers, VGG-B has 13 weight layers, VGG-C has 16 weight layers, VGG-D has 16 weight layers, and VGG-E has 19 weight layers. Among them, convolution layers and fully connected layers generally refer to weight layers. Some neural networks even have hundreds of layers. Not only that, as the number of layers increases, the number of parameters of the neural network also increases exponentially. For example, AlexNet has 60 million parameters involved in the computation. Both a plurality of layers and a plurality of parameters require a large number of on-chip and off-chip input/output accesses, which will consume a lot of resources and delay the computing time.

In intelligent computing systems, by programming frameworks, common operations in neural network model algorithms, such as convolution, pooling, and so on, are encapsulated into operators and made available for programmers to directly call. TensorFlow, PyTorch, and the like are currently popular deep learning frameworks. In these programming frameworks, computational graphs are usually used to describe the computing process of machine learning algorithms, tensors are used to represent all data in the computational graph, and operators are used to represent various operations.

A mechanism to reduce input/output access in neural network model computing is to fuse operators in the computational graph. However, the current solutions for operator fusion basically rely on manual analysis. When the scale of the neural network is large and the number of operators is very large, this method is extremely cumbersome and inefficient. Therefore, a solution for automatic fusion of operators is urgently needed.

SUMMARY

In order to at least partially solve one or more technical problems mentioned in the background technology, the present disclosure provides a solution for automatic fusion of operators in a computational graph, which automatically searches for the optimal way for fusion of operators based on data-driven and performance evaluation models.

In a first aspect, the present disclosure discloses a method for automatic fusion of operators in a computational graph implemented by a processing device: determining control data that affects fusion performance of the operators by the processing device; for hardware information of a computing device to execute the computational graph, generating different control data samples based on the control data by the processing device; applying the control data samples to compute fusion benefits of candidate fusion subgraphs corresponding to the different control data samples by the processing device; and determining an optimal fusion way according to the fusion benefits by the processing device, compiling and optimizing the computational graph based on the optimal fusion way to obtain a corresponding binary instruction sequence, and allocating the binary instruction sequence to the computing device to execute a task corresponding to the computational graph.

In a second aspect, the present disclosure provides a processing device for performing automatic fusion processing of operators in a computational graph, comprising a processor configured to execute program instructions; and a memory configured to store the program instructions, which, when loaded and executed by the processor, enables the processor to execute the method for automatic fusion of operators in the computational graph according to the first aspect of the present disclosure.

In a third aspect, the present disclosure provides a computer-readable storage medium having program instructions stored therein, which, when loaded and executed by a processor, enables the processor to execute the method for automatic fusion of operators in the computational graph according to the first aspect of the present disclosure.

In a fourth aspect, the present disclosure provides a computer program product, including a computer program or instructions, which, when executed by a processor, implements the method for automatic fusion of operators in the computational graph described in the first aspect of the present disclosure.

Through the solution for automatic fusion of operators provided above, the disclosed embodiment provides an optimization solution for a computational graph, which uniformly defines the information affecting the performance of operator fusion as control data, thereby converting the search problem for the optimal fusion solution of operators into the search problem for the optimal control data, and by providing a suitable performance evaluation model, the disclosed embodiment may realize automatic search for the optimal fusion way of operators. Some embodiments of the present disclosure also provide a variety of search algorithms to adapt to different network models. Other embodiments of the present disclosure also provide a weight residence solution to maximize the benefits of weight residence.

DRAWINGS

By reading the following detailed description with reference to the accompanying drawings, the above-mentioned and other objects, features and advantages of the exemplary embodiments of the present disclosure will become easier to understand. In the accompanying drawings, several embodiments of the present disclosure are shown in an exemplary but not restrictive manner, and the same or corresponding reference numerals indicate the same or corresponding parts of the embodiments.

FIG. 6 illustrates an exemplary flowchart of a method for automatic fusion of operators at the L1 storage level according to an embodiment of the present disclosure;

FIG. 7 illustrates an example of a fusion search of adjacent operators;

FIG. 9 illustrates an exemplary flowchart of a method for automatic fusion of operators at the L2 storage level according to an embodiment of the present disclosure;

FIG. 10a illustrates an exemplary flowchart of a method for solving a weight residence problem according to an embodiment of the present disclosure;

DETAILED DESCRIPTION

Technical solutions in embodiments of the present disclosure will be described clearly and completely hereinafter with reference to the drawings in the embodiments of the present disclosure. Obviously, the embodiments to be described are merely some rather than all examples of the present disclosure. All other embodiments obtained by those skilled in the art based on the embodiments of the present disclosure without creative efforts shall fall within the protection scope of the present disclosure.

It should be understood that terms such as "first", "second", "third", and "fourth" appear in the claims, the specification, and drawings are used for distinguishing different objects rather than describing a specific order. The terms "including" and "comprising" used in the specification and the claims of the present disclosure indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely intended to describe specific embodiments rather than to limit the present disclosure. As being used in the specification and the claims of the disclosure, unless the context clearly indicates otherwise, the singular forms "a", "an", and "the" are intended to include the plural forms. It should also be understood that the term "and/or" used in the specification and the claims of the present disclosure refers to any and all possible combinations of one or more of relevant listed items and includes these combinations.

As being used in this specification and the claims, the term "if" can be interpreted as "when", or "once" or "in response to a determination" or "in response to a detection" depending on the context.

Detailed embodiments of the present disclosure are described below in detail with reference to the accompanying drawings.

Exemplary Hardware Environment

Figures 1, 2:
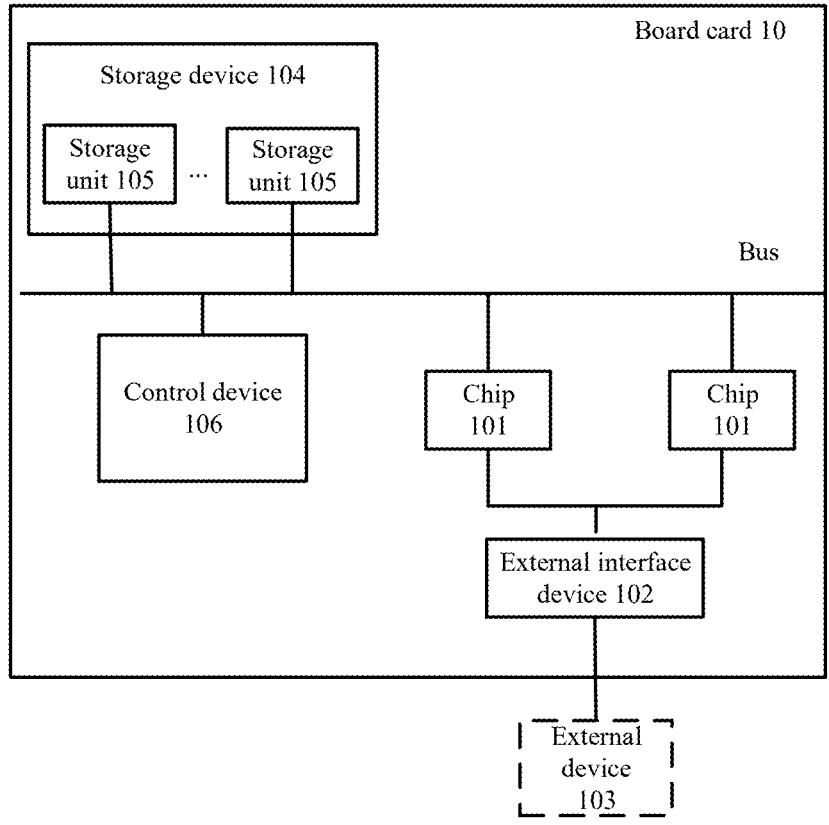
FIG. 1 illustrates a diagram of a structure of a board card according to an embodiment of the present disclosure.
FIG. 2 illustrates a diagram of a structure of a combined processing device according to an embodiment of the present disclosure.

FIG. 1 illustrates a schematic diagram of a structure of a board card 10 according to an embodiment of the present disclosure. As shown in FIG. 1, the board card 10 includes one or more chips 101, which is a system on chip (SoC), integrated with one or more combined processing devices. The combined processing device is an artificial intelligence computing unit that supports various deep learning and machine learning algorithms to meet the intelligent processing requirements in complex scenarios in the fields of computer vision, speech, natural language processing, data mining, and so on. Especially, deep learning technology is widely applied in the field of cloud intelligence. A significant feature of cloud intelligence applications is the large amount of input data, which places high demands on the storage capacity and computing power of the platform. The board card 10 of this embodiment is suitable for cloud intelligence applications, and has huge off-chip storage, on-chip storage and powerful computing power.

The chip 101 is connected to an external device 103 via an external interface device 102. The external device 103 is, for example, a server, a computer, a camera, a display, a mouse, a keyboard, a network card, or a Wifi interface and so on. The data to be processed can be transmitted from the external device 103 to the chip 101 via the external interface device 102. The computation results of the chip 101 can be transmitted back to the external device 103 via the external interface device 102. According to different application scenarios, the external interface device 102 may have different interface forms, for example, a peripheral component interconnect express (PCIe) interface and so on.

Board card 10 also includes a storage device 104 for storing data, which includes one or more storage unit 105. The storage device 104 is connected to the control device 106 and the chip 101 through a bus for data transmission. The control device 106 in board card 10 is configured to regulate and control the state of chip 101. To this end, in an application scenario, the control device 106 may include a microcontroller, also known as a micro controller unit (MCU).

FIG. 2 illustrates a diagram of a structure of a combined processing device in the chip 101 of this embodiment. As shown in FIG. 2, the combined processing device 20 includes a computing device 201, an interface device 202, a processing device 203, and a storage device 204.

The computing device 201 is configured to execute an operation specified by a user, and is mainly implemented as a single-core intelligent processor or a multi-core intelligent processor, and is configured to execute depth learning or computation of machine learning. The computing device 201 may interact with the processing device 203 through the interface device 202 to jointly complete the operation specified by the user.

The interface device 202 is configured to transfer data and control instructions between the computing device 201 and the processing device 203. For example, the computing device 201 may obtain input data from the processing device 203 via the interface device 202 and write the data into the storage device on the chip of computing device 201. Further, the computing device 201 may obtain control instructions from the processing device 203 via the interface device 202 and write the control instructions into a control cache on the chip of computing device 201. Alternatively or optionally, the interface device 202 may also read data in a memory device of the computing device 201 and transmit the data to the processing device 203.

As a general-purpose processing device, the processing device 203 executes basic control including, but not limited to, data transfer, and turning on and/or stopping of the computing device 201. According to different implementations, the processing device 203 may be a central processing unit (CPU), a graphics processing unit (GPU) or one or more types of processors in other general-purpose and/or special-purpose processors. These processors include, but not limited to, a digital signal processor (DSP), an application specific integrated circuit (ASIC), a field-programmable gate array (FPGA) or another programmable logic device, a discrete gate or transistor logic device, a discrete hardware component, or the like. Furthermore, the number may be determined according to actual requirements. As mentioned above, only with respect to computing device 201 of the present disclosure, it may be viewed as having a single-core structure or a homogeneous multi-core structure. However, when the computing device 201 and the processing device 203 are considered together, they are considered to form a heterogeneous multi-core structure.

The storage device 204 is configured to store to-be-processed data, which may be a Dynamic Random Access Memory (DRAM) and a Double Data Rate (DDR) memory, and generally has a size of 16G or larger, and is configured to store data of the computing device 201 and/or the processing device 203.

When the computing device 201 runs a neural network, it is generally necessary to first compile the neural network using the processing device 203 to obtain an executable file. The executable file contains device information, which indicates on which device of the heterogeneous computer system the executable file should be executed. After the executable file is assembled and linked, an executable program of the neural network may be obtained, and the executable program is stored in the storage device 204.

The processing device 203 may read the executable program from the storage location of the executable program and obtain a plurality of tasks of the program according to the executable program. These tasks are distributed to the computing device 201 for execution via the interface device 202, and finally the computation results are obtained.

Figure 3A:
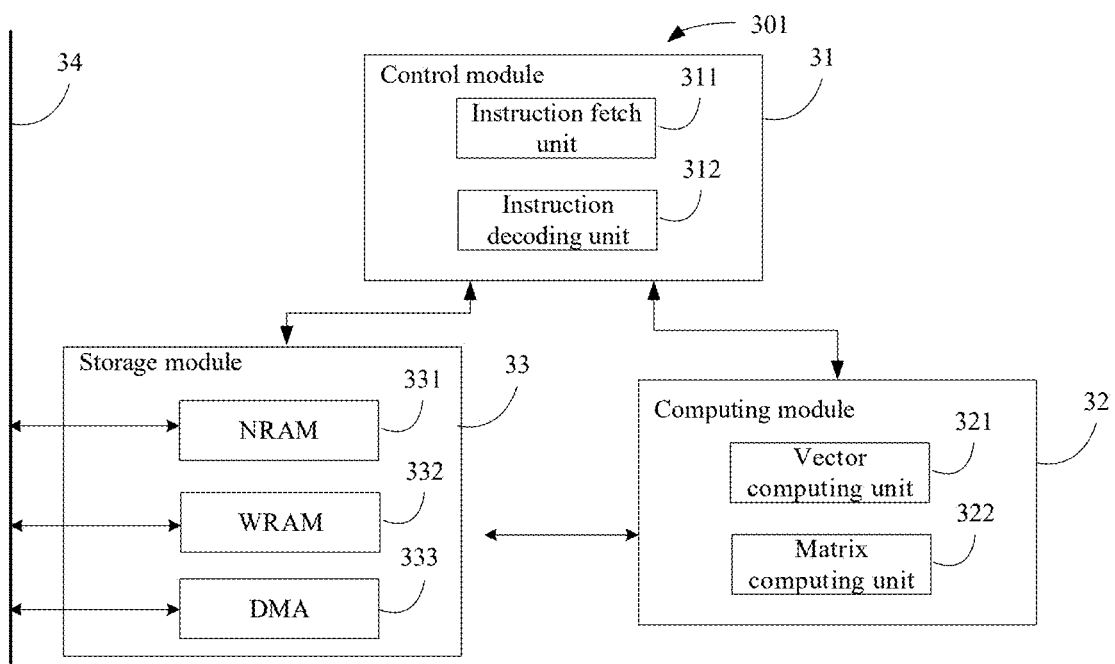
FIG. 3a illustrates a schematic diagram of an internal structure of a single-core computing device according to an embodiment of the present disclosure.

FIG. 3a illustrates a schematic diagram of the internal structure of the processing core when the computing device 201 is a single-core device. The computing device 301 is used to process input data such as computer vision, speech, natural language, data mining and the like. The computing device 301 includes three modules: a control module 31, a computing module 32, and a storage module 33.

The control module 31 is configured to coordinate and control the work of the computing module 32 and the storage module 33, so as to complete a task of depth learning, and the control module 31 includes an instruction fetch unit (IFU) 311 and an instruction decoding unit (IDU) 312. The instruction fetch unit 311 is used to fetch instructions from the processing device 203, and the instruction decoding unit 312 decodes the fetched instructions and sends the decoding results as control information to the computing module 32 and the storage module 33.

The computing module 32 includes a vector computing unit 321 and a matrix computing unit 322. The vector computing unit 321 is used to perform vector computation and may support complex computations such as vector multiplication, addition, nonlinear transformation and so on; the matrix computing unit 322 is responsible for the core computations of the deep learning algorithm, for example, matrix multiplication and convolution.

The storage module 33 is used for storing or transferring related data, and includes a Neuron RAM (NRAM) 331, a weight RAM (WRAM) 332, and a direct memory access (DMA) 333. NRAM 331 is used to store input neurons, output neurons and intermediate results after computation; WRAM 332 is used to store a convolution kernel of the deep learning network, which is a weight; DMA 333 is connected to a DRAM 204 through a bus 34 and is responsible for data transfer between the computing device 301 and the DRAM 204.

Figure 3B:
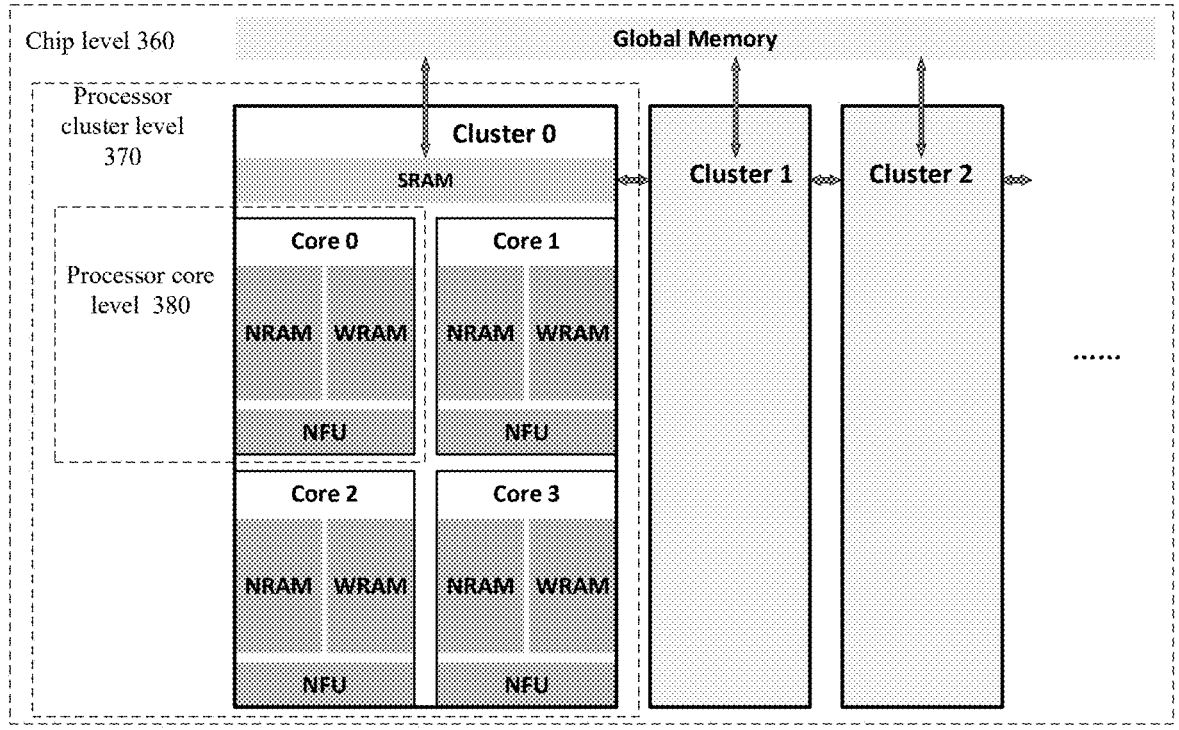
FIG. 3b illustrates a schematic diagram of an internal structure of an internal structure of a multi-core computing device according to an embodiment of the present disclosure.

FIG. 3b illustrates a simplified schematic diagram of the internal structure of the computing device 201 which is a multi-core device. The multi-core computing device may be abstracted using a hierarchical hardware model. As shown in the figure, the multi-core computing device may be abstracted into three levels, in other words, the chip level (Chip) 360, the processor cluster level (Cluster) 370 and the processor core level (Core) 380. The disclosed embodiment mainly involves the data transmission of the storage unit and computing unit part, so the drawings and descriptions briefly show and introduce the relevant computing structure, and omit other parts.

At the chip level, each chip contains local DDR storage, each processor chip serves as a computing and control unit, and each processor chip contains a plurality of multiprocessors as computing units.

At the processor cluster level, each multiprocessor includes a plurality of accelerator cores as control and computing units, and also has shared storage, for example, static random access memory (SRAM), as a storage unit.

At the processor core level, each accelerator core contains local storage and a local processing unit array. NFU refers to the Neuron Function Unit, which is used for convolution computation.

In the multi-core computing device, the storage model includes a board global memory, a shared memory (SRAM) on the Cluster, an NRAM, a WRAM and registers on the Core, and so on. In order to obtain better performance, data movement between storage levels below the Card and the balance between memory access and computing can be explicitly controlled. SRAM is contained in the Memory process Unit (MPU or Mem Core). Core refers to the Intelligent process Unit Core (IPU Core or Core) in a multi-core computing device. 1 IPU Core contains an NRAM, a WRAM, an NFU, and so on. Cluster refers to a processor cluster or computing cluster. Usually a multi-core computing device contains several Clusters, and a Cluster contains 1 Mem Core+N IPU Cores.

Exemplary Operator Fusion Solution

Regarding the terms "node" and "operator (OP)" mentioned in this disclosure, it should be noted that the term "operator" is from the computing level of the computer (or from the software level or algorithm level); while the term "node" is a more figurative term (from the graphical level or a more intuitive level). In terms of the content referred to, the terms "operator" and "node" actually refer to the same thing. In other words, in this disclosure, it can be considered that the terms "operator" and "node" have the same meaning and can be used interchangeably, but are described from different aspects.

In general, there are a large number of operators in a neural network, and when the computing device 201 executes the computation logic of these operators, it usually loops through the following steps:

reading the computation result of the previous operator from the off-chip cache (such as the storage device 204), executing the computation task of the current operator based on the computation result of the previous operator, and writing the computation result of the computation task to the off-chip cache (such as the storage device 204) after completing the computation task of the current operator.

Therefore, when the computing device performs a computing task of a neural network, data exchange is required every time the related computation of an operator is completed. This may reduce data processing efficiency as well as occupy inter-chip communication resources.

As mentioned in the background technology, a typical optimization of the computational graph is operator fusion, in other words, computing a plurality of operators together in a single core without saving the intermediate results back to the global memory, thereby effectively reducing the input/output access in the network model computation.

A known operator fusion method is based on the topological sequence of operators in the computational graph to find operators that may be fused. A topological sequence is obtained by topologically sorting a Directed Acyclic Graph (DAG) and arranging all vertices in the DAG into a linear sequence. In graph theory, topological sorting is a linear sequence of all vertices in a directed acyclic graph, and the sequence must meet the following two conditions.

1. Each vertex appears and only appears once.

2. If there is a path from a vertex A to a vertex B, then vertex A appears before the vertex B in the sequence.

Usually, such a linear sequence is called a sequence that satisfies the topological order, or topological sequence for short. That is to say, the topological sequence is the order established based on the mutual dependence between operators in the computational graph. In this fusion method, the operators are sorted according to the topological order, and adjacent operators are allowed to be fused. However, this method causes some interconnected operators in the computational graph (operators with input-output relationships) to be unable to be fused due to non-adjacent topological order, reducing the possibility of fusion.

Another operator fusion way is to find the operator fusion way in the computational graph based on some predetermined rules. However, this rule is only effective for a specific network model and has poor universality.

In the disclosed embodiment, various fusion feasibility and various data splitting feasibility in the computational graph are traversed to obtain the operator list in the computational graph with fusion possibility and scheduling policy; in the scheduling policy, the information affecting the operator fusion performance, such as the operator list of fusion possibility, data splitting way, pipeline way, weight residence, weight preloading and other information, is uniformly defined as control data, thereby converting the search problem of the optimal operator fusion way into the search problem of the optimal control data.

In this way, the operator fusion is not limited to the topological order adjacency, and operators connected in input/output in the computational graph are allowed to be fused. On the other hand, the disclosed embodiment may provide a performance evaluation function of the fusion operator according to the control data of the fusion operator for specific hardware information. Based on the performance evaluation function, the fusion benefit of the fusion operator may be computed to select the optimal fusion way according to the fusion benefit. According to the disclosed embodiment, the time evaluation is relatively accurate and the search space is sufficient, and the more optimal operator fusion way under various networks may be found.

Figure 4:
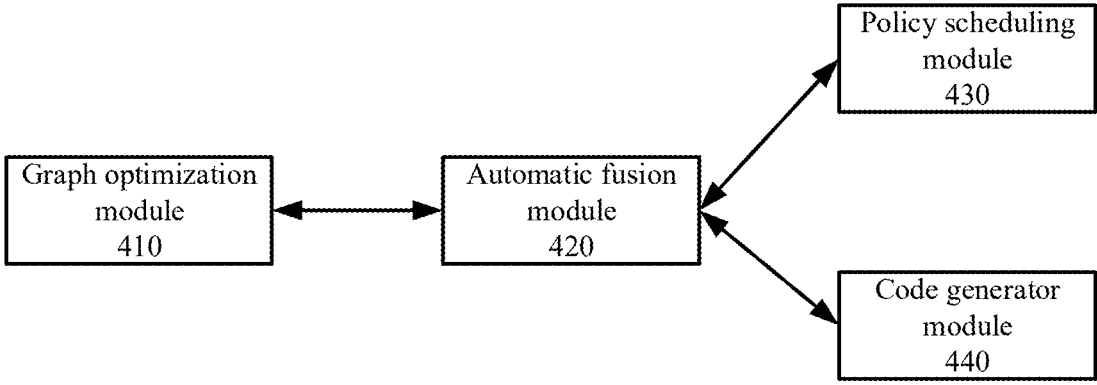
FIG. 4 illustrates an exemplary system architecture to which a solution for automatic fusion of operators of the disclosed embodiment may be applied.

FIG. 4 shows an exemplary system architecture to which the operator automatic fusion solution of the disclosed embodiment may be applied. As shown in the figure, the system architecture includes a graph optimization module 410, an automatic fusion module 420, a policy scheduling module 430, and a code generator module 440.

The graph optimization module 410 may be used to optimize the computational graph of the network model without involving the underlying hardware information, including but not limited to pruning, constant folding, arithmetic simplification, layout optimization, and so on.

The main function of the automatic fusion module 420 is to interact with the policy scheduling module 430 through the set search algorithm, provide the graph optimization module 410 with the optimized computational graphs of various network models, and search for the operator fusion way with the optimal performance of various network models. Then, the code generator 440 can be called to compile these fusion operators into binary Kernel functions, and replace the subgraph of the fusion operator with a single fusion operator in the computational graph.

The main function of the policy scheduling module 430 is to traverse various fusion possibilities and various split possibilities in the computational graph to obtain the subgraphs that may be fused in the computational graph and scheduling policies; split the computation operations involved in the subgraph in terms of dimensions; carry out address deduction based on the split results, determine the on-chip space that the subgraph needs to occupy during the computation process, and compare the capacity of the on-chip space with the capacity of the on-chip space of the computing device shown in FIG. 3b to determine the feasibility of fusion. And the control information corresponding to the feasibility of the fusion is fed back to the automatic fusion module 420.

The main function of the code generator 440 is to generate the corresponding Kernel when the automatic fusion module 420 selects a more optimal subgraph. Among them, the Kernel is a CPU function called by the runtime.

The specific functions and interaction ways of the automatic fusion module 420 and the policy scheduling module 430 will be described in detail later. However, those skilled in the art may understand that the division of the modules in the above figure is based on the logical functions, and there may be other splitting ways in actual implementations. For example, the automatic fusion module and the policy scheduling module 430 may be combined into one module, or the functions of the automatic fusion module and the policy scheduling module 430 may be split into more modules. The disclosed embodiment has no limitation in this respect.

In the disclosed embodiment, the fused and optimized network model is executed in the hardware environment described above. Specifically, referring to FIG. 3b again, the NRAM, WRAM and other memories on the IPU of each processor core of the processor core level 380 may be abstracted as the L1 storage level, and the SRAM on the MPU of the processor cluster level 370 may be abstracted as the L2 storage level. The on-chip space mentioned above may refer to the space of the L1 storage level and/or the space of the L2 storage level. When the fused and optimized network model is executed in these hardware environments, the input and output of the fusion operator are the global memory of the chip level 360, such as DDR, where the intermediate result resides on the L2 storage level; the fusion operator may also be divided into several sub-operators, including the fusion sub-operator, where the input and output of each sub-operator are the L2 storage level, where the intermediate result resides on the L1 storage level. It may be understood that there are parallel and serial data split between different levels of storage, and each split involves the split dimension and split block size of the data.

To further elaborate, the first case is as follows: when the amount of input data/output data of a batch is very large, it cannot be fully loaded into the L2 storage level. In this case, the Input Output (IO)/computation parallel pipeline process of the neural network operator is divided into five stages, including:

The first stage is: loading the input data from DDR to the L2 storage level.

The second stage is: loading the input data on the L2 storage level to the L1 storage level, where the L1 storage level at this time is NRAM.

The third stage is: performing computation based on the input data on NRAM, obtaining output data, and storing the output data on the NRAM.

The fourth stage is: moving the output data from the NRAM to the L2 storage level for storage.

The fifth stage is: moving the output data from the L2 storage level to the DDR for storage.

The second case is when the on-chip space required for the input data/output data of a batch is less than or equal to the on-chip space on the MPU. In this case, the IO/computation parallel pipeline process of the neural network operator includes two layers of three-level pipelines. Among them, the three stages of the outer pipeline include the following.

The first stage is: loading input data from DDR to the L2 storage level.

The second stage is: performing computation based on the input data on the L2 storage level, obtaining output data, and storing the output data on the L2 storage level.

The third stage is: loading the output data from the L2 storage level to the DDR.

The three stages of the inner pipeline include the following.

The first stage is: loading input data from the L2 storage level to the L1 storage level, where the L1 storage level at this time is NRAM.

The second stage is: performing computation based on the input data of NRAM, obtaining output data, and storing the output data on the NRAM.

The third stage is: loading the output data from the NRAM to the L2 storage level.

In the second case, it may be seen from the above two-layer pipeline that the intermediate data of the computation is stored as intermediate data on the L2 storage level before being moved to the DDR as output data.

In some embodiments of the present disclosure, given that the intermediate results of the fusion operator in the computational graph reside at the L2 storage level, and the intermediate results of the fusion sub-operators in the fusion operator reside at the L1 storage level, the fusion way of the operator may include the fusion of the L1 storage level and the fusion of the L2 storage level. Further, the optimal fusion way may be searched in the following order: first, for the fusion of the L1 storage level, the optimal L1 fusion way is searched and determined; then, based on the optimal L1 fusion way, the optimal L2 fusion way is further searched and determined for the fusion of the L2 storage level. At this time, the control data of the L2 fusion way includes the control data of the L1 fusion. If the optimal L1 fusion way is searched first, then when searching for the optimal L2 fusion, the control data of the optimal L1 fusion may be reused, thereby greatly reducing the search space of the L2 fusion and speeding up the search. Of course, the optimal L2 fusion way may also be searched first, which is equivalent to having searched the search space of L2 fusion, and then conducting a search for the search space of L1 fusion. There is no situation of reusing the results. Since the solution space of control data related to L1 fusion is very large, the efficiency of obtaining the optimal fusion way in this order is relatively low. Those skilled in the art may produce other deformations or transformations based on the technical solution of the present application when they understand the essence of the technical solution of the present application, but as long as the functions implemented and the technical effects achieved are similar to those of the present application, they should all belong to the protection scope of the present application.

Figure 5:
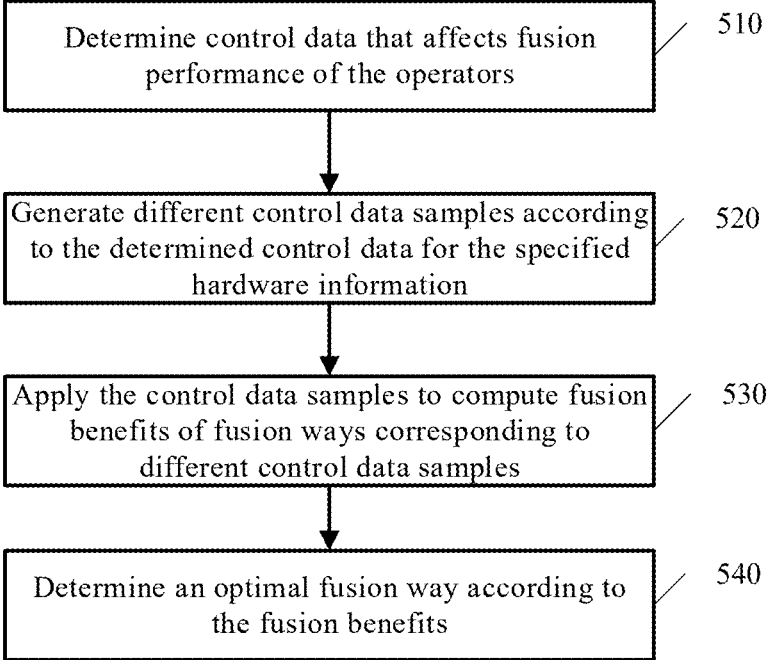
FIG. 5 illustrates an exemplary flowchart of a method for automatic fusion of operators according to an embodiment of the present disclosure.

FIG. 5 shows an exemplary flow chart of the method for automatic fusion of operators implemented by the processing device according to the embodiment of the present disclosure.

As shown in the figure, in step 510, the processing device determines control data that affects fusion performance of the operators.

In some embodiments, the main control data of the fusion operator includes one or more of the following: the operator list of each sub-operator in the fusion operator, the parallel splitting way of a plurality of L2 storage levels of the fusion operator, the serial splitting way of a single L2 storage level of the fusion operator, the IO/computation parallel pipeline way of the fusion operator, the parallel splitting way of a plurality of L1 storage levels of each fusion sub-operator, the serial splitting way of a single L1 storage level of each fusion sub-operator, the IO/computation parallel pipeline way of each fusion sub-operator, which model data resides on the L1 storage level, which model data resides on the L2 storage level, whether the fusion operator turns on weight preloading, and so on.

Different control data may be determined in different ways. The operator list of each sub-operator in the fusion operator may be directly determined according to the computational graph. The parallel splitting way of the plurality of L2 storage levels of the fusion operator involves the hardware information of the computing device running the computational graph; for example, in the hardware environment shown in FIG. 3b, it involves the split between each cluster at the processor cluster level.

The serial splitting way of a single L2 storage level of the fusion operator involves the split of the input feature map, and the parameters mainly include the dimension of the split.

For example, when the HW (height and width) dimension of the input feature map does not exceed the first threshold, such as when the entire feature map may be stored on a single L2 storage level, it may be considered as a "small graph mode" at this time, and its split dimension is N (batch) dimension. For another example, when the HW dimension of the input feature map exceeds the second threshold, it may be considered as a "large graph mode" at this time, and its split dimension can include N, H, and W dimensions. It may be understood that the parameter setting of the serial splitting way is only exemplary, and those skilled in the art may also construct more split ways, such as "medium graph mode", "super large graph mode", and so on, and the disclosed embodiment has no limitation in this regard. In addition, the parameters of the serial splitting way may also include the specific split block size of each split dimension. This parameter may be set when determining the control data, or when generating the control data sample for searching later. In some embodiments of the present disclosure, considering that the size of a specific split block is local, the specific split value of each split dimension may be searched and determined by the policy scheduling module 430 later.

The IO/computation parallel pipeline way of the fusion operator mainly involves whether to enable pipeline and how many levels of pipeline are used when pipeline is enabled. For example, the control data may be set to disable pipeline, then IO access and computation will not be executed in parallel. For another example, the control data may be set to enable pipeline, and for a small graph mode, an LCS three-level pipeline is enabled, and for a large graph mode, an LLCSS five-level pipeline is enabled, where L stands for Load, C stands for Compute, and S stands for Store.

The parallel splitting way of the plurality of L1 storage levels of each fusion sub-operator is mainly related to the dimension of the input feature graph, and may perform search in each dimension to traverse various dimensional split ways. These dimensions may include, for example, the N (batch) dimension, H (height) dimension, W (width) dimension, and C (channel) dimension of the input feature graph. The specific split value of each dimension may be determined, which depends on the number of computing components in the hardware implementation.

Similarly, the serial splitting way of a single L1 storage level of each fusion sub-operator also involves the split of the input feature graph, and the parameters mainly include the split dimension and the split block size. In some embodiments, considering the locality of the influence of this control data, it may also be searched and determined by the policy scheduling module 430 later.

The IO/computation parallel pipeline way of each fusion sub-operator is similar to the IO/computation parallel pipeline way of the fusion operator described above, and may also include disenabling pipeline, enabling pipeline, and enabling pipeline in several levels, which will not be described in detail here.

Regarding the data residence, usually in neural network computation, the weights of each network layer are fixed, so the resident data is usually the weight. In this regard, in some embodiments, data residence is sometimes also called weight residence. Through data residence, the data repeated loading time may be effectively reduced, the number of data reuses may be increased, and the overall computation may be accelerated. This control data may be set to non-resident or resident. When choosing to reside, it is possible to further determine which model data (e.g., which operator weights)

reside on the L1 storage level and which model data reside on the L2 storage level. The specific determination method will be described later.

Similar to data residence, the control parameter of whether the fusion operator turns on weight preloading may also be set to no preloading or preloading. When preloading is selected, the corresponding algorithm will be called for evaluation and decision-making to determine whether weight preloading is supported or only partial weight preloading is supported.

The determination of the above partial control data will be described later in conjunction with the specific implementation.

Continuing with FIG. 5, in step 520, different control data samples are generated according to the determined control data for the hardware information of the computing device to execute the computational graph. As described above, the optimization of operator fusion is closely related to the specific hardware architecture executing the computational graph. Different hardware architectures will have different search spaces for control data. Therefore, it is necessary to generate control data samples based on the determined control data in combination with the specified hardware information to fully search the value space of the control data.

For example, assuming that the serial splitting way of a single L2 storage level of the fusion operator is a large graph mode, and its split dimensions may include three dimensions: N, H, and W, then various control data samples of the combined split in the three dimensions of N, H, and W may be generated according to the specified hardware information, such as the capacity size of the L2 storage level, to traverse possible serial splitting ways.

Then, in step 530, these control data samples are applied to compute fusion benefits of the candidate fusion subgraphs corresponding to different control data samples.

In some embodiments, the generated control data samples may be applied to the candidate fusion subgraphs by the policy scheduling module 430, and combined with the hardware information specified above, whether the fusion solution is feasible is thus determined, and the running time of the candidate fusion subgraphs on the hardware architecture is estimated. Based on this performance evaluation model, the fusion benefits of different fusion ways may be computed.

In some embodiments, the fusion benefit may be expressed as the following formula:

Fusion benefit=the cumulative value of the shortest execution time of each operator before fusion−the shortest execution time of the operator after fusion.

Based on the above fusion benefit model, the fusion operator may be traversed according to the search algorithm to find the optimal operator fusion way.

That is, finally in step 540, an optimal fusion way is determined according to the fusion benefits. Then, the computational graph may be compiled and optimized based on the optimal fusion way to obtain the corresponding binary instruction sequence to be allocated to the computing device to execute the task corresponding to the computational graph. It can be understood that the fusion benefit of the optimal fusion way is the positive and maximum value among all possible fusion benefits.

Thus, the automatic fusion solution provided by the disclosed embodiment is described above, which can realize the search for the operator fusion way with the optimal performance by searching for the optimal control data by defining the control data related to the fusion performance and constructing the performance evaluation model.

As mentioned above, the fusion way of the operator may include the fusion of the L1 storage level and the fusion of the L2 storage level. Regardless of the fusion of which storage level, the fusion search may be performed according to the automatic fusion way described in FIG. 5 to find the optimal fusion way of the corresponding storage level. In some embodiments, firstly, for the fusion of the L1 storage level, the optimal L1 fusion way is searched and determined; then, based on the optimal L1 fusion way, the optimal L2 fusion way is further searched and determined for the fusion of the L2 storage level.

FIG. 6 illustrates an exemplary flowchart of a method for automatic fusion of operators at a L1 storage level according to an embodiment of the present disclosure.

As shown in the figure, in step 610, L1 fusion control data of the L1 storage level is determined. When searching for the operator fusion way at the L1 storage level, it is only necessary to determine the control data that affects the operator fusion performance at the L1 storage level, without considering all the control data listed above.

Specifically, the L1 fusion control data may include one or more of the following: a parallel splitting way of the fusion operator among the plurality of L2 storage levels; a serial splitting way of the fusion operator at a single L2 storage level; a parallel pipeline way of IO and computation of the fusion operator; a parallel splitting way of the fusion sub-operator among the plurality of L1 storage levels; and a parallel pipeline way of IO and computation of the fusion sub-operator.

It may be understood that the operator fusion at the L1 storage level is equivalent to the operator fusion in the sub-graph in the computational graph, or is called the fusion sub-operator, so the operator fusion at the L1 storage level only focuses on the control data at the sub-graph level, and does not focus on the control data at a higher level. For example, the L1 storage level does not focus on the optimization of weights, in other words, it does not focus on whether the weights are resident, whether the weights are preloaded, and so on. Therefore, the L1 fusion control data does not involve control data such as weight residence and weight preloading.

In addition, in some embodiments, considering that the serial splitting way of a single L1 storage level of each fusion sub-operator only affects the performance of the fusion operator of the L1 storage level itself, it may be searched and determined by the policy scheduling module 430, and is not included in the above L1 fusion control data.

Then, in step 620, for potential fusion operators are searched.

In some embodiments, when searching for potential fusion operators, a plurality of search methods may be mixed and adopted to adapt to different structures of various network models. These search methods include but are not limited to: a fusion search of adjacent operators, a fusion search of a block structure, and so on. The combination of search methods may also be varied. In some implementations, the fusion search of adjacent operator may be applied first, then the fusion search of block structure may be applied, and finally the fusion search of adjacent operator may be applied again. In other implementations, the fusion search of block structure may be applied first, and then the fusion search of adjacent operator may be applied. Various search methods will be described in detail later.

Then, in step 630, for each potential fusion operator, the L1 fusion control data sample generated based on the L1 fusion control data is applied to compute the fusion benefit of the fusion way corresponding to the L1 fusion control data sample.

In the method for automatic fusion of operators at the L1 storage level, the L1 fusion control data sample is generated according to the determined L1 fusion control data for the specified hardware information.

For example, assuming that the parallel splitting way of the fusion sub-operator among the plurality of L1 storage levels in the L1 fusion control data is set to split in N and C dimensions, then according to the number of computing components in the hardware, for example, 4 processor cores, various combinations of split L1 fusion control data sample in N and C dimensions may be generated to traverse possible parallel splitting ways.

For another example, the serial splitting way of a single L1 storage level of each fusion sub-operator mentioned above may be searched and determined by the policy scheduling module 430. At this time, various serial splitting ways may be traversed according to, for example, the storage capacity of a single L1 storage level and the dimensional information of the input feature map, to generate a corresponding L1 fusion control data sample.

Finally, in step 640, the optimal L1 fusion way is determined according to the fusion benefit. Simply put, the fusion way corresponding to the maximum and positive fusion benefit is the optimal L1 fusion way. Specifically, depending on the search process, the comparison object of the above fusion benefit is slightly different, which will be described later in conjunction with the specific search method.

Therefore, by defining the L1 fusion control data related to the fusion of the L1 storage level and generating L1 fusion control data sample accordingly, the optimal L1 fusion way may be searched and determined by the search method.

In the fusion search of adjacent operator, backtracking from the output operator of the computational graph to the input operator direction is performed. The adjacent operators are attempted to fuse according to the following algorithm to find the two adjacent nodes with the largest fusion benefit:

fusing the current operator with its front and back adjacent operators in the backtracking direction respectively to find the first operator with the largest and positive fusion benefit;

fusing the first operator with its front and back adjacent operators in the backtracking direction respectively to find the second operator with the largest and positive fusion benefit;

when the second operator is consistent with the aforementioned current operator, fusing the current operator with the first operator; and repeating the above steps until no operator can be fused.

FIG. 7 illustrates an example of a fusion search of adjacent operators. The computational graph shown in the figure includes a plurality of operators A, B, C, D and E, which are connected in sequence in the backtracking direction from the output operator to the input operator, in other words, the search direction is the backtracking direction from the operator A to the operator E.

First, for the current operator A, it may be fused with its front and back adjacent operators in the backtracking direction respectively. At this time, there is only the front adjacent operator B, so the operator A and the operator B are tried to be fused to find the first operator with the largest and positive fusion benefit, which is the operator B in this example.

Next, the first operator (the operator B) is fused with its front and back adjacent operators in the backtracking direction respectively. At this time, the operator B has the front adjacent operator C and the back adjacent operator A, so the operator B is tried to be fused with the operator C and the operator A respectively to find the second operator with the largest and positive fusion benefit. In this example, it is assumed that the second operator found is the operator A.

It is determined whether the second operator is the same as the current operator, in the above example, the second operator and the current operator are both the operator A, so the operator A and the operator B may be tried to be fused. At this time, the fused operator that fuses the operator A and the operator B may be called the operator A'. In other words, when two operators are each other's preferred fusion operators, the two operators may be fused. Otherwise, no fusion is performed.

The above search steps may be tried repeatedly until no operator may be fused. For example, in the above example, after fusing the operator A and the operator B, the search in the backtracking direction may continue to be performed, taking the operator C as the current operator, and repeating the above steps. If the preferred fusion operator of the operator C is the operator A', and the preferred fusion operator of the operator D is the operator E, then the operator D and the operator C are not fused, and the search continues to the operator E. Assuming that the preferred fusion operator of the operator E is the operator D, the operator E and the operator D are fused, called the operator D'. Thus, a fusion search is performed on the entire computational graph. The solid line box in the figure represents a determined fusion, and the dotted line box represents a fusion attempt.

Since operator fusion occurs during this fusion search, in other words, the computational graph changes, such as becoming a computational graph containing the operator A', the operator C, and the operator D', it is necessary to perform a fusion search on the changed computational graph again. For example, whether there is a possibility of fusion among the operator A', the operator C, and the operator D'. If the operator C may be fused with the operator D', the computational graph changes, and the fusion search needs to be performed again according to the above steps until the computational graph no longer changes.

Through this fusion search way of adjacent operator, the operator fusion is not limited to topological order adjacency. As long as the operators with connected inputs/outputs in the computational graph are allowed to be fused, the possible potential operator fusion ways are explored as much as possible to maximize the fusion optimization effect.

According to the fusion benefit formula mentioned earlier, it may be understood that in order to compute the fusion benefit, it is necessary to compare the execution time difference before and after the fusion. Therefore, for each operator in the unfused computational graph, it is also necessary to apply the L1 fusion control data sample according to the above method to determine its execution time. The specific processing method is equivalent to treating a single operator as one fusion operator or subgraph, applying various possible control data samples to it, and solving accordingly. In this process, some operators that may not support the current fusion way may also be learned, and then such operators may be marked, so that these operators may be avoided in the subsequent fusion process to avoid unnecessary attempts.

In the fusion search of block structure, a fusion search is performed for a multi-branch integrated block structure existing in the network model. The block structure refers to a subnetwork in a neural network model that has only one input and one output, but there are a plurality of branches in the subnetwork, in other words, some layers of the subnetwork have a plurality of inputs or outputs, such as the Resblock structure of Resnet50 and the Block structure of Inception_v3. The fusion of this block structure may greatly reduce the amount of IO, but because this structure requires more than two operators to form, the fusion search of adjacent operator policy often fails to optimize it, and a fusion search for the block structure is required.

When attempting to fuse a structure with a plurality of branches integrated, if all permutations and combinations are attempted to fuse and the way with the optimal performance is selected, the optimal solution may be obtained, but when the number of branches is large, it takes a long time to compile. Therefore, in the operator fusion at the L1 storage level, a simplified processing is to prioritize the operators fusion with short execution times, in other words, the fusion search is performed in the order of priority fusion of the branches with short execution time within the block structure, so that the execution time of the fused sub-operators at the L1 storage level is relatively uniform. Since the computation time/execution time of the operator is generally proportional to the loading time of the weight, this fusion way is conducive to leveraging the parallel pipeline of weight IO and computation. When the execution time of the sub-operator is relatively uniform, the loading time of the weight may be effectively masked in the parallel pipeline of IO and computation, thereby avoiding IO bottlenecks and better achieving the purpose of weight preloading.

Specifically, in the operator fusion search at the L1 storage level, the following algorithm may be used to perform a fusion search on each branch of the block structure to find a branch fusion way that is successfully fused and has a positive fusion benefit:

According to the above priority order, in other words, in the order of the execution time of the operators of each branch in the block structure from smallest to largest, the branches in the block structure are sorted;

Similarly, each branch is traversed according to this priority order to perform fusion attempts to find a branch fusion way that achieves successful fusion and has a positive fusion benefit.

Figure 8:
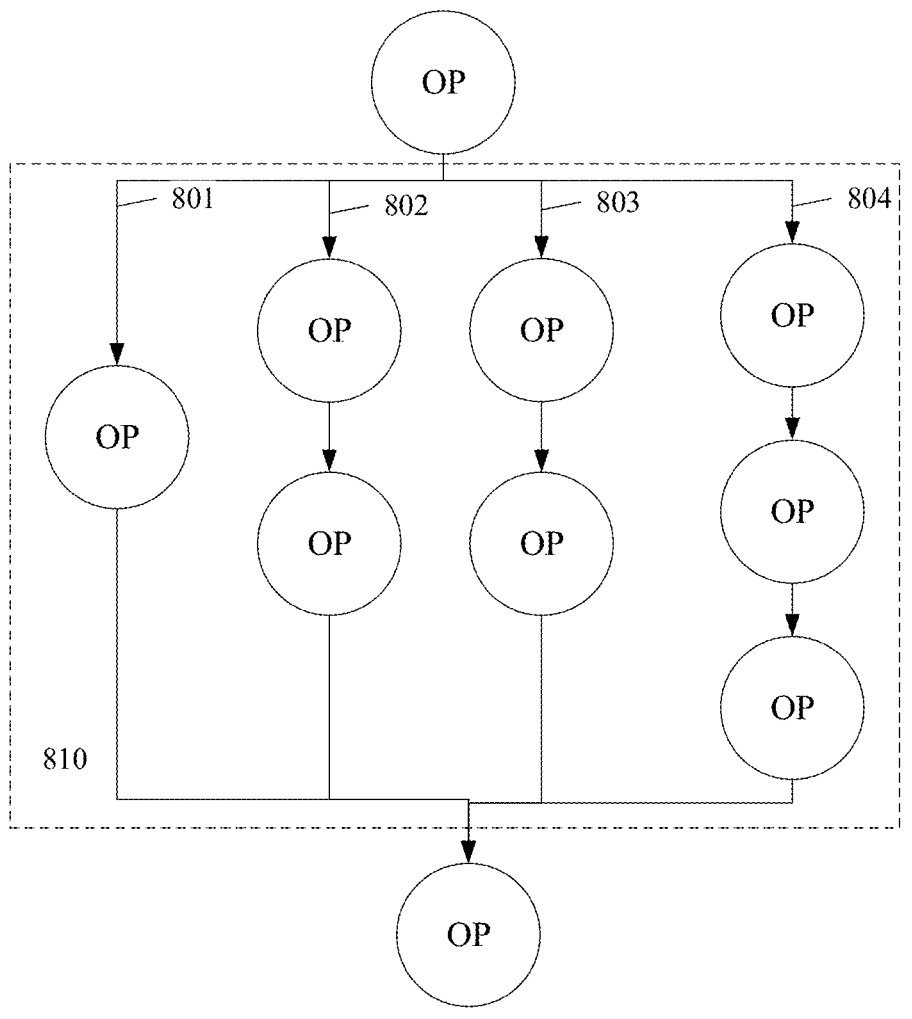
FIG. 8 illustrates an example of a fusion search of a block structure.

FIG. 8 shows an example of a fusion search of a block structure. The figure shows a block structure 810 in the computational graph, which includes four branches 801, 802, 803, and 804, and each branch includes several operators.

First, the branches are sorted in ascending order according to the accumulated execution time of the operators on each branch. In this example, it is assumed that the execution time of the four branches is sorted as follows: 801<802<803<804.

Then, the branches are tried to be fused in the above sorting order. For example, first, based on the branch 801, an attempt is made to fuse it with the branch 802.

Then, for this fusion attempt, the L1 fusion control data sample generated based on the L1 fusion control data may be applied to compute the fusion benefit of the fusion way corresponding to the L1 fusion control data sample. The above process may be performed by the policy scheduling module 430 in FIG. 4, for example. If the fusion fails (the policy scheduling module 430 returns the result information of success or failure) or the fusion benefit is negative, then branch 802 is not fused. Next, other branches are attempted until all branches have been attempted.

For example, assuming that the fusion attempt of the branch 801 and the branch 802 fails, then the branch 801 and the branch 803 continue to be attempted for fusion. If the fusion still fails, the branch 801 and the branch 804 are attempted for fusion. If the fusion still fails, the fusion combinations based on the branch 802 with the branch 803 and the branch 804 are attempted. This process continues until all branches have been attempted.

Assuming that the fusion attempt of the branch 801 and the branch 802 is successful and the fusion benefit is positive, then the fusion of the branch 801 and the branch 802 is kept, and continue to attempt to fuse the next branch 803 on this basis.

Therefore, the above text provides a simplified fusion search method for the block structure in the neural network model, which does not need to attempt all branch permutations and combinations, thus saving search time. In addition, by performing the fusion attempts in the order of execution time from small to large, it is beneficial to fully utilize the pipelining of weight IO and computation, and solve the problem of IO bottleneck. Moreover, the above fusion search method of block structure may support both the situation where all branches may be fully fused and the situation where only some branches may be fused, so it has a wide range of adaptability.

After searching to determine the preferred L1 fusion way of the L1 storage level according to the above way, the preferred L2 fusion way may be further searched and determined for the fusion of the L2 storage level based on the preferred L1 fusion way.

FIG. 9 illustrates an exemplary flowchart of a method for automatic fusion of operators at the L2 storage level according to an embodiment of the present disclosure. Similar to the fusion method of the L1 storage level, the fusion method of the L2 storage level also needs to determine fusion control data, search for fusion operators, and apply fusion control data samples. Therefore, in the following description, only the differences between the two are described separately, and the rest of the content may refer to the description of the previous text in combination with FIG. 5-FIG. 8.

As shown in the figure, in step 910, the L2 fusion control data of the L2 storage level is determined. When searching for the operator fusion way of the L2 storage level, since the operator fusion way of the L1 storage level has been determined, such as the parallel splitting of the inner layer and the inner layer pipeline, and so on, it is only necessary to determine the control data that affects the operator fusion performance of the L2 storage level, in other words, the outer layer control data, without considering all the control data listed above. This may also greatly reduce the possibility of fusion attempts, in other words, reduce the search space, thereby improving the search speed.

Specifically, the L2 fusion control data may include one or more of the following: the parallel splitting way of the fusion operator among the plurality of L2 storage levels; the serial splitting way of the fusion operator in a single L2 storage level; the parallel pipeline way of IO and computation of the fusion operator; whether to enable weight preloading; and whether to enable weight residence.

The operator fusion at the L2 storage level mainly considers the optimization of weights, in other words, whether to enable the weight preloading, whether to enable the weight residence, and so on. For example, if the weight residence is enabled, the storage space will be consumed, thereby affecting the depth of fusion.

When the weight preloading is set to be enabled in the L2 fusion control data, in response to the determination that the weight preloading is enabled, the corresponding weight preloading algorithm will be called to determine whether the weight storage space meets the requirements for the weight preloading.

When the weight preloading is enabled, a method similar to Ping-Pong pipeline is usually used to improve the preloading efficiency. In the Ping-Pong pipeline, at least two storage areas are usually configured, for example, by dividing the storage space of the memory into at least two storage areas, to support data access between one of the storage areas and, for example, an external storage unit, while simultaneously supporting data access between the other storage area and, for example, a processing core. These two storage areas may be called Ping storage space and Pong storage space.

Therefore, the constraint condition of the weight preloading is that the maximum value of the weight accumulation storage requirements of any adjacent sub-operators in the computational graph cannot exceed the weight storage space. If not exceeded, it may be determined that the weight storage space meets the weight preloading requirements. For example, suppose the computational graph includes four adjacent sub-operators, for example, A, B, C and D, whose weight storage requirements are 100 k, 200 k, 600 k and 800 k respectively. Then the weight accumulation storage requirements of any adjacent sub-operators are: A+B=300 k, B+C=800 k, C+D=1400 k respectively. Assuming that the allocated weight storage space is 1M, the weight preloading cannot be supported for the current computational graph because C+D=1400 k>1M.

When the weight storage space does not meet the weight preloading requirements, the sub-operators in the computational graph may be split until the weight preloading requirements are met or the sub-operators can no longer be split. Sub-operators usually contain several operators, so they may be split. For example, continuing the above example, the sub-operator D may be split, for example, into a sub-operator D1 and a sub-operator D2, whose corresponding weight storage requirements are 300 k and 500 k respectively. Then the C+D item becomes C+D1=900 k and D1+D2=800 k, both of which are less than the weight storage space 1M. Therefore, the split computational graph may support the weight preloading.

It may be understood that when the weight preloading requirement is still not met after the split, the result of weight preloading failure will be returned. In this case, the control data can only be set to not enable the weight preloading.

When the weight residence is set to be enabled in the L2 fusion control data, in response to the determination that the weight residence is enabled, the corresponding weight residence algorithm will be called to determine the best weight residence solution at the L1 storage level and the best weight residence solution at the L2 storage level in turn.

When the storage space that may be resident is determined, the weight of an operator that resides may be used to compute the benefits of residing that operator. At this point, the residence problem may be transformed into a classic knapsack problem.

The knapsack problem is an NP-complete problem for combinatorial optimization. The knapsack problem may be described as: given a set of items, each item has its own weight and price. Within the limited total weight, how to choose to make the total price of the items the highest. The name of the problem comes from how to choose the most suitable items to be placed in a given knapsack. The knapsack problem may also be described as a deterministic problem, in other words, whether the total value can reach V under the premise that the total weight does not exceed W?

For weight residence, the problem may be described as maximizing the residence benefit when the total storage size of the weight does not exceed the residence storage space. However, in the weight residence problem, the size of the knapsack will change, because the non-residence weights also require storage space, so the size of the knapsack depends on the size of the non-residence weights.

FIG. 10a illustrates an exemplary flowchart of a method for solving a weight residence problem according to an embodiment of the present disclosure.

As shown in the figure, in step 1010, the candidate weights may be arranged in a descending order according to the required storage space. For example, assuming that there are n candidate weights, they are arranged in a descending order according to the required storage space. It is assumed that $Cw1>Cw2>Cw3\ldots>Cwn$, where w1 to wn represent n candidate weights, and Cw1 to Cwn represent the storage space required for the corresponding candidate weights.

Then, in step 1020, the candidate weights are traversed in sequence in the above order. During the traversal, for each candidate weight, two situations, for example, resident and non-resident, are considered, and the optimal resident way when it is non-resident is solved.

First, for the first candidate weight w1 with the largest occupied space, in other words, the current weight is w1, and the selection between residence and non-residence is made. Here, it is assumed that the size of the resident storage space initially provided is C0. On the one hand, when the current weight is selected to be non-resident, sufficient storage space needs to be reserved for the non-resident weight to be loaded when the computation is performed, so the available resident storage space becomes $C1-C0-Cw1$. At this point, the solution of the weight residence is converted into a knapsack problem, the knapsack size is C1, and the weights that may reside are w2 to wn. According to the solution to the knapsack problem, the optimal residence solution under the current conditions may be found. It is assumed that the optimal residence solution obtained is S1. Since a storage space of size Cw1 has been reserved in advance, even if the weights that do not reside in the optimal residence solution S1 obtained by solving the knapsack problem have sufficient storage space for loading during computation, because the storage space required for any subsequent weight is less than Cw1, the reserved space may be reused. On the other hand, when the current weight is selected to be resident, the available resident storage space is updated to $C1=C0-Cw1$.

Then, the next weight w2 is traversed to. Similarly, the selection between residence and non-residence may be made. When the non-resident is selected, the available resident storage space becomes $C2=C1-Cw2$. Similarly, the solution of the weight residence is converted into a knapsack problem, the knapsack size becomes C2, and the weights that may reside are w3 to wn. According to the solution to the knapsack problem, the optimal residence solution under the current conditions may be found. It is assumed that the optimal residence solution obtained is S2. When the current weight w2 is selected to reside, the available resident storage space is updated to $C2=C1-Cw2$ again.

Similarly, the remaining weights are processed one by one. After all traversals are completed, n optimal residence solutions obtained by solving the knapsack problem may be obtained, in other words, n optimal residence solutions S1, S2, . . . , Sn.

Finally, in step 1030, an optimal residence solution is selected as the final solution from the n optimal residence solutions obtained during the traversal process. As mentioned earlier, the benefits after the weight residence may be regarded as values, and each optimal residence solution has a corresponding value. The optimal residence solution with the largest value is taken as the optimal solution for weight residence.

Figure 10B:
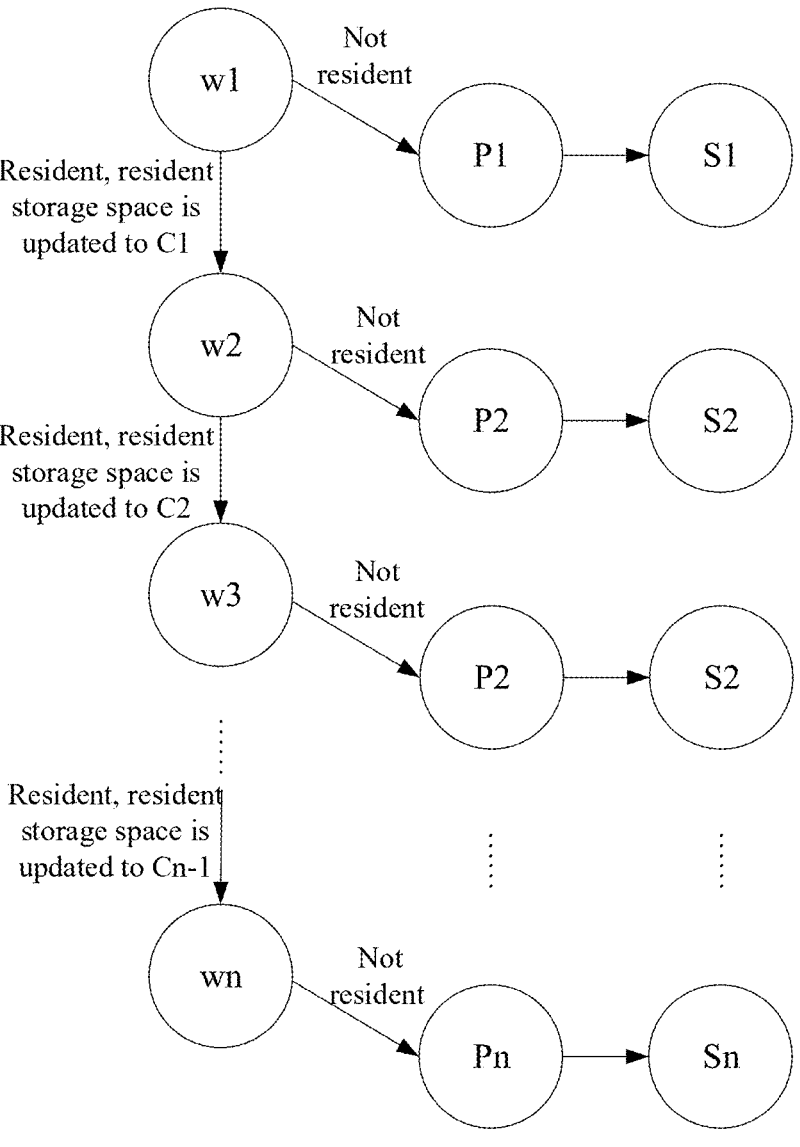
FIG. 10b illustrate an exemplary traversal process for solving the weight residence problem according to an embodiment of the present disclosure.

FIG. 10b illustrate an exemplary traversal process for solving the weight residence problem according to an embodiment of the present disclosure. In this example, the scenario of the embodiment of FIG. 10a is still assumed.

As shown in the figure, the candidate weight w1 is first traversed, and when w1 does not reside, the knapsack problem P1 is constructed. In the knapsack problem P1, the knapsack size is the current available resident storage space minus the storage space required for the candidate weight currently traversed, in other words, $C1=C0-Cw1$; the items that may be placed in the knapsack, in other words, the weights, are the candidate weights arranged after the candidate weight currently traversed, that is, w2 to wn, and the value of each weight is the corresponding residence benefit. The optimal residence solution S1 may be solved according to various knapsack problem solving methods.

When w1 is resident, the current available resident storage space is updated to $C1=C0-Cw1$, and then the next candidate weight w2 is entered. When w2 is not resident, the knapsack problem P2 is constructed and the optimal residence solution S2 is solved and obtained. Therefore, when traversing each candidate weight, it will be divided into a branch to solve the corresponding knapsack problem and obtain an optimal residence solution.

Finally, the best one is selected from the obtained n optimal residence solutions as the final solution.

The above method may be used when determining the best residence solution for weights at the L1 storage level, and it may also be used when determining the best residence solution for weights at the L2 storage level. For example, when weights cannot all reside at the L1 storage level, the best residence solution for the L1 storage level may be determined first to maximize the benefits of L1 weight residence. At this time, the candidate weights may be all weights. After determining the best residence solution for the L1 storage level, the weights that do not reside at the L1 storage level may be considered to reside at the L2 storage level. At this time, the candidate weights are those remaining weights that do not reside at the L1 storage level.

It may be understood that although the solution for determining weight residence is described in the scenario of automatic fusion of operator, the solution may also be used independently of this scenario or applied to other scenarios. For example, when a neural network model is executed on a specific hardware architecture, a preferred residence solution may be designed according to the weight residence method provided by the embodiment of the present disclosure, thereby maximizing the residence benefit.

Returning to FIG. 9, after determining the L2 fusion control data, in step 920, potential fusion operators are searched.

Similar to the fusion search at the L1 storage level, the fusion search at the L2 storage level may also use a combination of a plurality of search methods. These search methods also include but are not limited to: a fusion search of adjacent operators, a fusion search of a block structure, and so on. The combination of search methods may also be varied. In the fusion search at the L2 storage level, the fusion search of adjacent operator method is similar to the fusion search at the L1 storage level, and will not be repeated here. However, the fusion search of the block structure is slightly different.

At the L2 storage level, the purpose of sorting the branches of the block structure is to maximize the number of branches to be fused, which can better save IO overhead. The key factor that most affects the fusion of the L2 storage level is the L2 memory occupancy. Therefore, the branches with small L2 memory overhead under the same batch should be fused first.

Specifically, when searching to determine the optimal L2 fusion way, the fusion search is performed in the order of priority that the branches with large batch numbers in the block structure are fused first, and the branches that occupy less L2 storage space when the batch numbers are the same are fused first. Therefore, after sorting the branches in the block structure according to this priority order, the possible branch fusion way may still be searched by referring to the search method described in conjunction with FIG. 8.

Then, in step 930, for each potential fusion operator, the L2 fusion control data sample generated based on the L2 fusion control data is applied to compute the fusion benefit of the fusion way corresponding to the L2 fusion control data sample.

In the method for automatic fusion of operators at the L2 storage level, the L2 fusion control data sample is generated according to the determined L2 fusion control data for the specified hardware information.

For example, assuming that the serial splitting way of the fusion operator in the L2 fusion control data on a single L2 storage level is set to a large graph mode, L2 fusion control data samples with various combinations of splits in dimensions N, H, and W may be generated to traverse possible serial splitting ways.

Finally, in step 940, the optimal L2 fusion way is determined according to the fusion benefit. Similarly, the fusion way corresponding to the maximum and positive fusion benefit is the optimal L2 fusion way.

Therefore, by defining the L2 fusion control data related to the fusion of the L2 storage level and generating L2 fusion control data sample accordingly, the optimal L2 fusion way may be searched and determined by the search method.

In the previous description, for each fusion operator, the control data sample is applied to compute the fusion benefits of the fusion ways corresponding to different control data samples. In some embodiments, this step may be performed by the policy scheduling module 430 of FIG. 4. Generally, for the same computation result, there may be several different computation ways (corresponding to the control data samples and fusion ways in the disclosed embodiment), and these different computation ways will lead to different locality and performance. Therefore, in the disclosed embodiment, controlling how to perform computation is called "scheduling". Scheduling is a set of primitives used to describe operations such as splitting way, parallelization, merging of loops and so on.

In the process of applying control data samples to each fusion operator, the policy scheduling module 430 determines whether the searched candidate fusion way is feasible and the corresponding performance parameters (such as space occupancy, run time, and so on) through scheduling. Specifically, the policy scheduling module 430 mainly involves the following functions: address derivation, memory allocation, run time evaluation, and so on.

Figure 11:
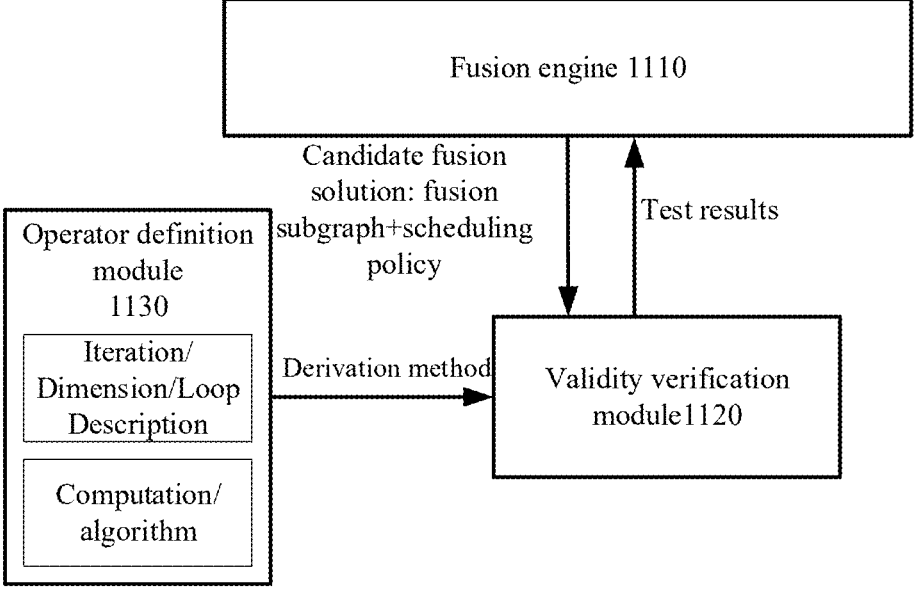
FIG. 11 illustrates a schematic block diagram of a policy scheduling process according to an embodiment of the present disclosure.

FIG. 11 illustrates a schematic block diagram of the policy scheduling process according to an embodiment of the present disclosure.

As shown in the figure, the fusion engine 1110 may search the input computational graph, search for possible operator fusion solutions (for example, fusion subgraphs) thereon, and also search for possible scheduling policies, to output as candidate fusion solutions. The scheduling policy here may correspond to, for example, the control data samples described above, including various policies such as pipeline splitting, parallel splitting, serial splitting, data residence, and so on. Therefore, it may be understood that the fusion engine 1110 here includes the functions of the automatic fusion module 420 described in FIG. 4 above and part of the functions of the policy scheduling module 430. In this embodiment, for the sake of convenience of description only, the functions are re-divided from the functional perspective. As understood by those skilled in the art, these functional divisions may take various forms. The disclosed embodiment of this disclosure is not limited to a specific form of functional division.

In some embodiments, the scheduling policy may provide several fixed modes. These fixed modes are, for example, the preferred scheduling methods for specific intelligent computing hardware. Thus, according to the specific hardware configuration, the corresponding scheduling policy may be selected from these limited fixed modes.

In one example, a scheduling policy mode is a large graph mode, which may be divided into 5 levels, and the N, H, and W dimensions of the data are split in the process of loading from the external storage circuit to the shared storage circuit. In another example, a scheduling policy mode is a small graph mode, which may be divided into 2 layers and 3 levels, and the H and W dimensions of the data are not split in the process of loading from the external storage circuit to the shared storage circuit, and are split when the data is loaded from the shared storage circuit to the storage circuit of the processing core. In another example, a scheduling policy mode is a mode without a shared memory, which may be divided into 1 layer and 3 levels, for example.

For the candidate fusion solution output by the fusion engine 1110, the validity verification module 1120 may verify the validity of each candidate fusion solution to confirm whether the candidate fusion solution is feasible. The validity verification mainly includes space verification.

Since the computation of the computational graph involves various splits, such as serial splitting, parallel splitting, pipeline splitting, and so on, it is necessary to ensure that there is enough space on the chip. Therefore, it is necessary to perform address derivation through a series of algorithms and then perform address allocation, thereby confirming whether the given hardware configuration can accommodate the data under the current candidate fusion solution, thereby completing space verification.

When performing space verification, it is necessary to use the operator information in the computational graph, and the operator information may be provided by the operator definition module 1130.

In some embodiments, the operator definition module 1130 may provide definitions of several types of operators, including but not limited to: Convolution (Conv), Pool, Elementwise, Broadcast, and so on. Various combinations of operators in these categories can basically represent the algorithms of most neural network models. Each operator category may include several operators, for example, the Elementwise category may include commonly used activation functions (such as Relu, GELU), ScalarMultiply (multiplying each element of Tensor by a scalar); the Convolution category may include Depthwise convolution, Dconv deconvolution; the Pool category may include maximum pooling (Maxpool), average pooling (Avergepool), and so on.

Further, according to the computation characteristics of different dimensions, it may be classified according to the derivation method of the operator dimension. The derivation methods of these dimensions may include, but are not limited to: sliding window, add pad, elementwise, broadcast, nosplit, and so on. For example, for the shape derivation of the convolution operator, its N dimension may be an Elementwise splitting way, the H and W dimensions may be Sliding window splitting way, and the C dimension may be a Nosplit way.

The definition of the operator may include the following information: descriptions related to iterations, dimensions and/or loops, and specific computation/algorithm.

Different types of operators may have corresponding address derivation formulas according to the derivation categories of each dimension. Thus the validity verification module 1120 may quickly perform space verification according to the information provided by the operator definition module 1130.

The derivation formula actually describes requirements of the operator for input and output addresses. For example, assuming for a vector addition operator, its derivation formula is that the i-th input address corresponds to the i-th output address, in other words, there is a one-to-one correspondence. Therefore, when deriving the address, assuming that the output address is from the i-th to the i+N-th, it may be deduced that the input address is also from the i-th to the i+N-th, thereby determining the storage space required for the operator.

After the validity verification module 1120 obtains the candidate fusion solution (including the fusion subgraph and the scheduling policy) from the fusion engine 1110 and obtains the operator information from the operator definition module 1130, it may perform address derivation and memory allocation for the entire computation, thereby checking whether the candidate fusion solution is feasible. The validity verification module 1120 may also analyze the execution time of the fusion subgraph. These test results may be returned to the fusion engine 1110 for the fusion engine 1110 to determine the final fusion solution.

After confirming the final fusion solution, the fusion engine may send the fusion subgraph and the corresponding scheduling information to the code generator module (see the code generator module 440 in FIG. 4) to perform real instruction generation.

In the above embodiment, by fixing the scheduling policy to a limited number of preferred modes, the search process of automatic fusion may be accelerated, and the detection of the validity verification module may be simplified. Furthermore, by clearly defining the type of the operator, for example, dividing the type by the derivation method of the dimension, the validity verification module may quickly perform address derivation based on this prior information, thereby simplifying the verification process and speeding up the verification.

The inventor applies the automatic fusion solution of the embodiment of the present disclosure to more than ten typical visual models that have been disclosed, and the performance of the fusion way obtained may be comparable to the optimal fusion way of manual analysis.

The present disclosure also provides a processing device, which may be used to implement the method for automatic fusion of operators in the computational graph.

Figure 12:
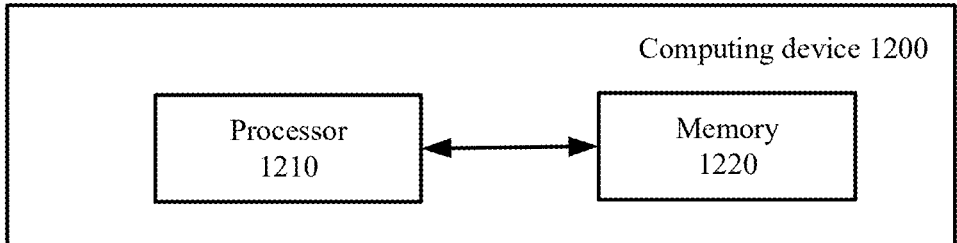
FIG. 12 illustrates a block diagram of hardware configuration of a computing device that may implement various solutions of the embodiments of the present disclosure.

FIG. 12 illustrates a block diagram of hardware configuration of a processing device 1200 that may implement various solutions of the embodiments of the present disclosure. As shown in the figure, the processing device 1200 may include a processor 1210 and a memory 1220. In the processing device 1200 of FIG. 12, only the constituent elements relevant to this embodiment are shown. Therefore, it is obvious to those skilled in the art that the processing device 1200 may also include common constituent elements different from the constituent elements shown in FIG. 12, such as a display.

The processing device 1200 may correspond to a computing device having various processing functions, for example, a computing device for compiling a computational graph. For example, the processing device 1200 may be implemented as various types of devices, such as a personal computer (PC), a server device, a mobile device, and so on.

A processor 1210 is configured to execute program instructions to control all functions of the processing device 1200. For example, the processor 1210 controls all functions of the processing device 1200 by executing a program stored in a memory 1220 on the processing device 1200. The processor 1210 may be implemented by a central processing unit (CPU), a graphics processing unit (GPU), an application processor (AP), an artificial intelligence processor chip (IPU), and the like provided in the processing device 1200. However, the present disclosure is not limited thereto.

The memory 1220 is hardware for storing various data processed in the processing device 1200. For example, the memory 1220 may store processed data and data to be processed in the processing device 1200. The memory 1220 may store data that has been processed or is to be processed by the processor 1210, such as a computational graph before automatic fusion, a computational graph after automatic fusion, and so on. In addition, the memory 1220 may store program instructions such as applications, drivers and the like to be driven by the processing device 1200. For example, the memory 1220 may store various programs related to the automatic fusion algorithm of the computational graph to be executed by the processor 1210, and so on. The memory 1220 may be a DRAM, but the present disclosure is not limited thereto. The memory 1220 may include at least one of a volatile memory or a non-volatile memory. Non-volatile memory may include a read-only memory (ROM), a programmable ROM (PROM), an electrically programmable ROM (EPROM), an electrically erasable programmable ROM (EEPROM), a flash memory, a phase-change Memory RAM (PRAM), a magnetoresistive random access memory (MRAM), a resistive random access memory (RRAM), a ferroelectric random access memory (FRAM), and so on.

Volatile memory may include dynamic random access memory (DRAM), static RAM (SRAM), synchronous dynamic random-access memory (SDRAM), PRAM, MRAM, RRAM, ferroelectric RAM (FRAM), and so on. In an embodiment, the memory 1220 may include at least one of a hard disk drive (HDD), a solid state drive (SSD), a high density flash memory (CF), a secure digital (SD) card, a micro-SD card, a mini-SD card, an extreme Digital (xD) card, a cache, or a memory stick.

In summary, the specific functions implemented by the memory 1220 and the processor 1210 of the processing device 1200 provided in the embodiment of this specification can be explained in comparison with the aforementioned embodiment in this specification, and can achieve the technical effects of the aforementioned embodiment, which will not be repeated here.

In the embodiment of the present disclosure, a computer-readable storage medium is also provided, in which program instructions are stored. When the program instructions are loaded and executed by the processor, the processor executes a method for automatic fusion of operators of a computational graph described in the embodiment of the present disclosure.

In an embodiment of the present disclosure, a computer program product is also provided, including a computer program or instructions, which, when executed by a processor, implements a method for automatic fusion of operators of a computational graph described in an embodiment of the present disclosure.

According to different application scenarios, the electronic device or device of the present disclosure may include a server, a cloud server, a server computing cluster, a data processing device, a robot, a computer, a printer, a scanner, a tablet computer, a smart terminal, a PC device, an Internet of Things terminal, a mobile terminal, a cell phone, a tachograph, a navigator, a sensor, camera, video camera, camcorder, a projector, a watch, headphones, a mobile storage, a wearable device, a visual terminal, an automatic driving terminal, a vehicle, a household appliance, and/or a medical device. The vehicle comprises an aircraft, a ship and/or a vehicle; the household appliance comprises a television, an air conditioner, a microwave oven, a refrigerator, an electric cooker, a humidifier, a washing machine, an electric lamp, a gas stove and a cooking machine; the medical device comprises a nuclear magnetic resonance meter, a B-Supervisometer and/or an electrocardiograma electronic devices or apparatuses of the present disclosure may also be applied to the fields of the Internet, Internet of Things, data centers, energy sources, traffic, public management, manufacturing, education, grids, telecommunications, finance, retail, worksites, healthcare, and the like. Further, the electronic device or apparatus of the present disclosure may also be applied to application scenarios related to artificial intelligence, big data, and/or cloud computing such as a cloud, an edge, a terminal and so on. In one or more embodiments, the electronic device or apparatus with high computing power according to the solutions of the present disclosure may be applied to a cloud device (for example, a cloud server), and the electronic device or apparatus with low power consumption may be applied to a terminal device and/or an edge device (for example, a smart phone or a camera). In one or more embodiments, hardware information about a cloud device and hardware information about a terminal device and/or an edge device are compatible with each other, so that appropriate hardware resources can be matched from hardware resources of the cloud device according to the hardware information about the terminal device and/or the edge device to simulate hardware resources of the terminal device and/or the edge device, to achieve unified management, scheduling, and collaborative work of end cloud integration or cloud edge end integration.

It should be noted that, for the purpose of conciseness, the present disclosure describes some methods and embodiments thereof as a series of actions and combinations thereof, but those skilled in the art may understand that the solutions of the present disclosure are not limited by the order of the described actions. Thus, in light of the disclosure or teachings of the present disclosure, those skilled in the art will appreciate that certain steps therein may be performed in other sequences or simultaneously. Further, those skilled in the art may appreciate that the embodiments described in this disclosure can be viewed as being optional, in other words, acts or modules involved therein are not necessarily required for implementation of certain one or more of the solutions of this disclosure. In addition, depending on the different solutions, the present disclosure also has different emphases on the description of some embodiments. In view of this, those skilled in the art can understand the parts not described in detail in one embodiment of this disclosure can also be referred to in the relevant descriptions of other embodiments.

In terms of specific implementation, based on the disclosure and teachings of the present disclosure, those skilled in the art may understand that several embodiments disclosed in the present disclosure may also be implemented in other manners not disclosed herein. For example, with respect to the various units in the electronic device or apparatus embodiments described above, the present disclosure divides them based on consideration of logical functions, but there may be other division methods in actual implementations. For another example, a plurality of units or components may be combined or integrated into another system, or certain features or functions within a unit or component can be selectively disabled. In terms of connection relationships between different units or components, the connections discussed above in connection with the figures may be direct or indirect couplings between the units or components. In some scenarios, the aforementioned direct or indirect coupling involves a communication connection utilizing an interface that can support electrical, optical, acoustical, magnetic, or other forms of signal transmission.

In the present disclosure, the units described as separate components may or may not be physically separate, and the components shown as units may or may not be physical units. The aforementioned components or units can be located in the same location or distributed across a plurality of network units. In addition, according to actual needs, some or all of the units can be selected to achieve the purpose of the solution described in this disclosed embodiment. Additionally, in some scenarios, a plurality of units in an embodiment of the present disclosure may be integrated into one unit or physically exist separately for each unit.

In other scenarios, the integrated unit may also be implemented in a form of hardware, in other words, a specific hardware circuit, which may include a digital circuit and/or an analog circuit. The physical implementation of the hardware structure of a circuit can include but is not limited to physical devices, which can include but are not limited to transistors or memristors. In view of this, the various devices described in the present disclosure (such as computing devices or other processing devices) may be implemented by appropriate hardware processors, such as a CPU, a GPU, an FPGA, a DSP and an ASIC. Furthermore, the aforementioned storage unit or storage device may be any appropriate storage medium (including magnetic storage medium or magneto-optical storage medium, etc.), which may be, for example, a resistive random access memory (RRAM), a dynamic random access memory (DRAM), a static random access memory (SRAM), an enhanced dynamic random access memory (EDRAM), a high bandwidth memory (HBM), a hybrid memory cube (HMC), an ROM, an RAM and so on.

The examples of the present disclosure have been described in detail above. Specific examples have been used in the specification to explain the principles and implementation manners of the present disclosure. The descriptions of the above examples are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

The invention claimed is:

1. A method for automatic fusion of operators in a computational graph implemented by a processing device, comprising:

determining, by the processing device, control data that affects fusion performance of the operators;

generating different control data samples according to the control data for hardware information of a computing device to execute the computational graph by the processing device;

applying the control data samples to compute fusion benefits of candidate fusion subgraphs corresponding to the different control data samples by the processing device; and determining an optimal fusion way according to the fusion benefits, compiling and optimizing the computational graph based on the optimal fusion way to obtain a corresponding binary instruction sequence, and allocating the corresponding binary instruction sequence to the computing device to execute a task corresponding to the computational graph by the processing device.

2. The method according to claim 1, wherein the hardware information comprises a processor cluster, a processor core, a L1 storage level, and a L2 storage level.

3. The method according to claim 2, wherein intermediate results of fusion operators in the computational graph reside at the L2 storage level, intermediate results of fusion sub-operators in the fusion operators reside at the L1 storage level, and fusion way comprises a fusion of the L1 storage level and a fusion of the L2 storage level, the method further comprises: searching to determine an optimal L1 fusion way for the fusion of the L1 storage level; and based on the optimal L1 fusion way, further searching to determine an optimal L2 fusion way for the fusion of the L2 storage level.

4. The method according to claim 3, wherein searching to determine the optimal L1 fusion way comprises:

determining L1 fusion control data of the L1 storage level, wherein the L1 fusion control data comprises one or more of the following:

a parallel splitting way of fusion operators among a plurality of L2 storage levels;

a serial splitting way of fusion operators in a single L2 storage level;

a parallel pipeline way of IO and computation of fusion operators;

a parallel splitting way of fusion sub-operators among a plurality of L1 storage levels; and a parallel pipeline way of IO and computation of fusion sub-operators.

5. The method according to claim 4, wherein searching to determine the optimal L2 fusion way comprises:

determining L2 fusion control data of the L2 storage level, wherein the L2 fusion control data comprises one or more of the following:

a parallel splitting way of fusion operators among a plurality of L2 storage levels;

a serial splitting way of fusion operators in a single L2 storage level;

a parallel pipeline way of IO and computation of fusion operators;

whether to enable weight preloading; and whether to enable weight residence.

6. The method according to claim 5, wherein searching to determine the optimal L1 fusion way or the optimal L2 fusion way further comprises:

searching for potential fusion operators; and for each potential fusion operator, applying a fusion control data sample generated based on corresponding fusion control data to compute a fusion benefit of a fusion way corresponding to the fusion control data sample.

7. The method according to claim 5, wherein searching to determine the optimal L1 fusion way or the optimal L2 fusion way further comprises combining one or more of the following to perform a fusion search on the operators in the computational graph:

a fusion search of adjacent operators; and a fusion search of a block structure.

8. The method according to claim 7, wherein the fusion search of the adjacent operators comprises:

backtracking from an output operator of the computational graph to an input operator;

fusing the current operator with its front and back adjacent operators in the backtracking direction respectively to find the first operator with the largest and positive fusion benefit;

fusing the first operator with its front and back adjacent operators in the backtracking direction respectively to find a second operator with the maximum and positive fusion benefit;

fusing the current operator with the first operator when the second operator is consistent with the current operator; and repeating the above steps until no operator is able to be fused.

9. The method according to claim 7, wherein the fusion search of the block structure comprises:

performing the fusion search in an order of priority that branches with short execution time in the block structure are fused first when searching to determine the optimal L1 fusion way; or performing the fusion search in an order of priority that branches with large batch numbers in the block structure are fused first, and branches that occupy less L2 storage space when the batch numbers are the same are fused first when searching to determine the optimal L2 fusion way.

10. The method according to claim 9, wherein the fusion search of the block structure further comprises:

sorting each branch in the block structure according to the order of priority; and traversing each branch according to the order of priority for fusion, and finding a branch fusion way with a successful fusion and a positive fusion benefit.

11. The method according to claim 5, wherein searching to determine the optimal L2 fusion way further comprises:

judging whether a weight storage space meets a weight preloading requirement in response to determining to enable weight preloading; and splitting sub-operators in the computational graph when the weight storage space does not meet the weight preloading requirement, until the weight preloading requirement is met or the splitting is not able to be performed.

12. The method according to claim 11, wherein judging whether the weight storage space meets the weight preloading requirement comprises:

judging whether a maximum value among weight accumulation storage requirements of any adjacent sub-operators in the computational graph exceeds the weight storage space, and if does not exceed, determining that the weight storage space meets the weight preloading requirement.

13. The method according to claim 5, wherein searching to determine the optimal L2 fusion way further comprises:

determining the best residence solution of a weight at the L1 storage level and the best residence solution of the weight at the L2 storage level in turn in response to determining to enable weight residence.

14. The method according to claim 13, wherein determining the best residence solution of the weight at the L1 storage level or the best residence solution of the weight at the L2 storage level comprises:

arranging candidate weights in a descending order of storage space;

traversing the candidate weights in sequence in the order, and solving optimal residence ways for each candidate weight when a current candidate weight does not reside according to the knapsack problem; and selecting the best one from the optimal residence ways solved as the best residence solution.

15. The method according to claim 14, wherein the size of the backpack in the backpack problem is a current available resident storage space minus a storage space required by the candidate weight currently traversed, a weight that is able to be placed in the backpack is a candidate weight arranged after the candidate weight currently traversed, and a value of each weight is a corresponding resident benefit.

16. The method according to claim 1, wherein generating different control data samples according to the control data comprises:

generating control data samples according to a fixed mode, wherein the fixed mode comprises any of the following: a large graph mode, a small image mode and a mode without a shared memory, and each mode defines different policies in one or more of the following aspects:

pipeline level splitting, parallel splitting, serial splitting, and data residence.

17. The method according to claim 1, wherein applying the control data samples comprises:

performing one or more of the following according to each control parameter in the control data samples for a candidate fusion subgraph: address derivation, memory allocation, and runtime estimation.

18. The method according to claim 17, wherein when performing address derivation, address derivation is performed on the candidate fusion subgraph based on predefined operator information.

19. The method according to claim 18, wherein the predefined operator information comprises a dimension derivation way, and the dimension derivation way comprises one or more of the following categories: sliding window, add pad, elementwise, broadcast, and no split.

20. The method according to claim 1, wherein the fusion benefit is determined based at least on the difference between the accumulated value of the shortest execution time of each operator before fusion and the shortest execution time of the operator after fusion.

* * * * *